Sept. 11, 1951 C. D. HEINOLD ET AL 2,567,601
NAIL CORRECTOR
Filed July 5, 1950
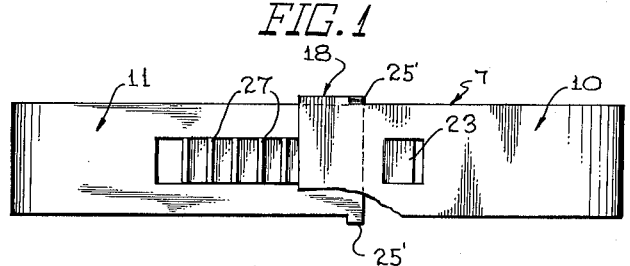
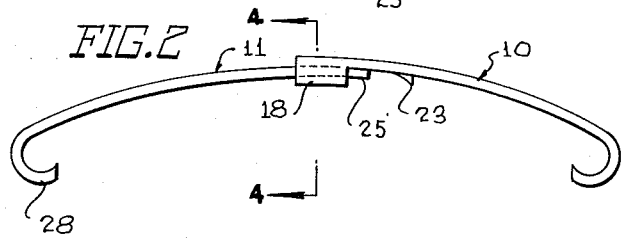
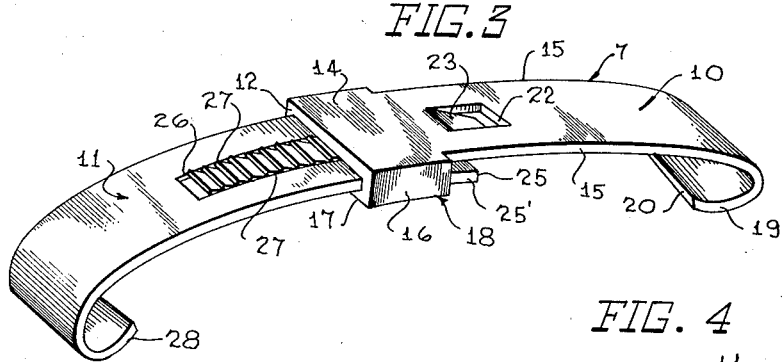
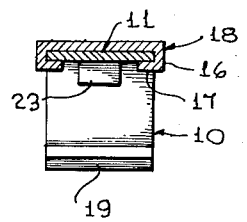
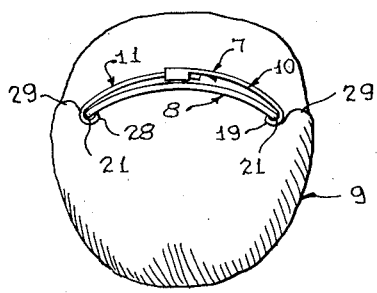
INVENTORS
CASSIUS D. HEINOLD
and HASKELL J. CORN
BY
ATTORNEYS Patented Sept. 11, 1951

2,567,601

UNITED STATES PATENT OFFICE 2,567,601

NAIL CORRECTOR

Cassius D. Heinold and Haskell J. Corn, Anderson, Ind.

Application July 5, 1950, Serial No. 172,148

2 Claims. (Cl. 128—81)

This invention relates to a device for correcting the growth of ingrowing nails, particularly nails of the toes, the primary object of the invention being to provide an efficient and practical device of this kind which can be worn with comfort and without interference with socks or hosiery and shoes, and which is readily adjustable for nails of different widths.

Another important object of the invention is to provide a device of the character indicated above which serves as a guide for cutting the nail in a manner to enhance proper growth of the nail being corrected, as the nail grows with the device in place thereon.

Other important objects and advantageous features of the invention will be apparent from the following description and the accompanying drawings, wherein, merely for purposes of illustration, a specific embodiment is set forth in detail.

In the drawings, wherein like numerals designate like parts throughout the several views:

Figure 1 is a top plan view, partly broken away;

Figure 2 is a side or edge elevation;

Figure 3 is a perspective view on an enlarged scale;

Figure 4 is a transverse, vertical section taken on the line 4—4 of Figure 2;

Figure 5 is a side or edge elevation, on a reduced scale, showing the device applied to correct an ingrown toenail.

Referring in detail to the drawings, the numeral 7 generally designates the illustrated corrector device, the numeral 8 a toenail to which the device is shown applied on a toe 9.

The device 7 comprises two longitudinally elongated, parallel sided sections 10 and 11, respectively, which can be made of spring steel, preferably of from .005 to .10 of an inch in thickness, and preferably of a main width of about three-sixteenths of an inch, and a length of about seven-eighths of an inch. These proportions are intended as approximations only and as illustrative of the form and arrangement of the device, and not as limitations.

The section 10 has, at its inner end 12, lateral extensions 14 which extend beyond the opposite side edges 15 and are projected downwardly at right angles, as indicated at 16, and projected laterally inwarly at right angles into spaced relation to the under side of the section 10, as indicated at 17, thereby defining a carrier and slide guide 18 for the section 11. The section 10 is curved or bowed longitudinally outwardly and downwardly, and has its outer end portion return bent at the under side thereof to define a hook 19 having a straight or plane terminal edge 20 for engaging under the related one of the side edges 21 of a toenail 8, as shown in Figure 5.

The section 10 is centrally punched out at 22 at a point near the carrier and guide 18, to provide a ratchet dog 23 having a straight or plane terminal end 23, the dog 23 extending downwardly and longitudinally outwardly with respect to the section 10 at an angle of about 30°.

The section 11 is similar to the section 10 except that the inner end 25 and the adjacent end portion are plain and devoid of a carrier and guide 18, and the upper surface of the section 11 is formed with a series of transversely extending, parallel depressions 26 cut or punched therein to define ratchet teeth 27 angled toward the longitudinally outward end of the section 11 for engagement by the ratchet dog 23. The inner end portion of the section 11 fits closely and slidably in the carrier and guide 18 in sliding engagement with the under side of the inner end portion of the section 10, whereby the sections 10 and 11 are in longitudinal alignment. The ratchet arrangement is such that with the hook 19 of the section 10 and the similar hook 28 on the outer end of the section 11 engaged under opposite side edges of the toenail 8 and the sections 10 and 11 pushed inwardly relative to each other as required by the width of the toenail, the dog 23 will be engaged with one of the ratchet teeth 27, whereby spreading of the sections by outward longitudinal movement thereof relative to each other is positively prevented. The inner end portion of the section 11 has laterally projecting ears 25' aligned with its inner end 25 to act as stops to engage the carrier and guide 18 to prevent outward separation of the sections 10 and 11.

Supposing that in manually adjusting the sections longitudinally inwardly relative to each other, sufficient adjustment is made to securely engage the hooks 19 and 28 under the nail edges, the ratchet dog 23 will then be engaged with a proper one of the ratchet teeth 27 to maintain the device in proper adjustment during the corrective growth of the nail 8. It is to be noted that the longitudinal curvature of the sections 10 and 11 is such as to limit bowing of the nail 8 to the proper curvature during corrective growth, and that in the process the edges of the nail 8 are held away from the flesh ridges 29 at the sides of the nail so that these ridges are disengaged from the nail and can heal and grow properly. As the corrected nail 8 grows, the forward longitudinal edge of the device serves as a guide for cutting the nail 8 straight across at the proper point to enhance proper corrective growth of the nail.

The device is removed from the nail 8 upon completion of corrective growth thereof by flexing the sections 10 and 11 relative to each other toward the nail sufficiently to free the ratchet dog 23 from the tooth 27 engaged thereby and permit the dog to move over the remaining ratchet teeth 27 as the sections are moved longitudinally outwardly relative to each other and the hooks 19 and 28 disengaged from the nail edges 21.

We claim:

1. In an ingrown nail corrector, a pair of sections having longitudinally inward ends in overlapping relation, carrier and guide means on the inward end of one of the sections in which the inward end of the other section is slidably confined, hooks on the other ends of said sections arranged to hook around the opposite side edges of a nail to be corrected, ratchet teeth on said other section, and a ratchet dog on said one section, said ratchet dog being selectively engageable with said ratchet teeth by moving said other section longitudinally inwardly relative to said one section to an adjusted position providing for effective engagement of said hooks with the nail edges, the engagement of said dog with a selected ratchet tooth serving to positively lock said sections against longitudinally outward displacement thereof relative to each other from an adjusted position.

2. In an ingrown nail corrector, a pair of sections having longitudinally inward ends in overlapping relation, carrier and guide means on the inward end of one of the sections in which the inward end of the other section is slidably confined, hooks on the other ends of said sections arranged to hook around the opposite side edges of a nail to be corrected, ratchet teeth on said other section, and a ratchet dog on said one section, said ratchet dog being selectively engageable with said ratchet teeth by moving said other section longitudinally inwardly relative to said one section to an adjusted position providing for effective engagement of said hooks with the nail edges, the engagement of said dog with a selected ratchet tooth serving to positively lock said sections against longitudinally outward displacement thereof relative to each other from an adjusted position, said ratchet teeth being on the side of said other section adapted to be remote from the nail and said ratchet dog projecting from the side of said one section adapted to be proximate to the nail.

CASSIUS D. HEINOLD.
HASKELL J. CORN.

REFERENCES CITED

The following references are of record in the file of this patent:

UNITED STATES PATENTS

| Number | Name | Date |
|---|---|---|
| 1,213,673 | Marvel | Jan. 23, 1917 |
| 1,451,311 | Smith | Apr. 10, 1923 |